United States Patent
Guthrie et al.

(10) Patent No.: US 7,768,743 B2
(45) Date of Patent: Aug. 3, 2010

(54) PERPENDICULAR MAGNETIC RECORDING WRITE HEAD WITH TRAILING SHIELD HAVING NOTCH AND THROAT HEIGHT DEFINED BY NONMAGNETIC PAD LAYER

(75) Inventors: Hung-Chin Guthrie, Saratoga, CA (US); Ming Jiang, San Jose, CA (US); Changqing Shi, Mountain View, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 738 days.

(21) Appl. No.: 11/747,656

(22) Filed: May 11, 2007

(65) Prior Publication Data

US 2008/0278855 A1 Nov. 13, 2008

(51) Int. Cl.
*G11B 5/127* (2006.01)
(52) U.S. Cl. .................. 360/125.13; 360/125.3
(58) Field of Classification Search .................. 360/125.02–125.32
See application file for complete search history.

(56) References Cited

U.S. PATENT DOCUMENTS

| | | | |
|---|---|---|---|
| 7,002,775 B2 | 2/2006 | Hsu et al. | |
| 7,140,095 B2 * | 11/2006 | Matono | 29/603.15 |
| 2005/0219747 A1 | 10/2005 | Hsu et al. | |
| 2006/0044682 A1 | 3/2006 | Le et al. | |
| 2006/0082924 A1 | 4/2006 | Etoh et al. | |
| 2006/0215314 A1 | 9/2006 | Chen | |
| 2006/0256483 A1 | 11/2006 | Sasaki et al. | |

* cited by examiner

*Primary Examiner*—A. J. Heinz
(74) *Attorney, Agent, or Firm*—Thomas R. Berthold

(57) ABSTRACT

A perpendicular magnetic recording write head supported on an air-bearing slider has a magnetic write pole (WP) with a WP end at the air-bearing surface (ABS) having a width generally equal to the data track width and a trailing shield (TS) with a TS end generally coplanar with the WP end. The TS has a first portion with a width at the TS end substantially wider than the width of the WP end and a TS notch (TSN) portion with a width at the TS end generally equal to the width of the WP end. The TS first portion has a height in a direction perpendicular to the ABS, and the TSN portion has a throat height (TH) in a direction perpendicular to the ABS that is less than the height of the TS first portion. A nonmagnetic gap layer separates the WP from the TSN portion and a nonmagnetic pad layer separates the WP from the TS first portion. The pad layer has a front edge generally parallel to and recessed from the ABS that defines the TH of the TSN portion, and a thickness that defines the length of the TSN portion in the along-the-track direction.

17 Claims, 17 Drawing Sheets

PERPENDICULAR MAGNETIC RECORDING WRITE HEAD WITH TRAILING SHIELD HAVING NOTCH AND THROAT HEIGHT DEFINED BY NONMAGNETIC PAD LAYER

BACKGROUND OF THE INVENTION

1. Field of the Invention

This invention relates generally to perpendicular magnetic recording write heads for use in magnetic recording disk drives, and more particularly to a write head with a trailing shield.

2. Description of the Related Art

Perpendicular magnetic recording, wherein the recorded bits are stored in a perpendicular or out-of-plane orientation in the recording layer, is a promising path toward ultra-high recording densities in magnetic recording hard disk drives. The recording or write head in perpendicular magnetic recording disk drives includes a write pole for directing magnetic field to data tracks in the recording layer, and one or more return poles for return of magnetic flux from the recording layer. The write head may also include a trailing shield (TS) of magnetically permeable material that faces the recording layer and is spaced from the write pole by a nonmagnetic gap. The use of a TS separated from the write pole by a nonmagnetic gap slightly alters the angle of the write field and makes writing more efficient. The TS must be very thin as measured in the generally perpendicular direction, i.e., perpendicular to the recording layer. This dimension is called the TS "throat height" (TH). However, it is difficult to reliably fabricate a TS to very small thicknesses. For that reason a nonmagnetic TS pad may be used. The TS pad has a recessed front edge and allows the TS to have a TH much thinner that the thickness of the remaining portion of the TS. A perpendicular magnetic recording write head with a TS and a TS pad is described in pending application Ser. No. 11/090,456 filed Mar. 25, 2005, published as US2006/215314 A1, and assigned to the same assignee as this application.

The TS is typically substantially wider than the write pole in the cross-track direction but may have a notch portion that is near the write pole and is generally the same width as the write pole. The trailing shield notch (TSN) causes a stronger magnetic field below the write pole and sharper magnetic transitions written by the head, which is desirable. However, a perpendicular magnetic recording write head with both a TSN and a nonmagnetic pad for precisely defining the TS TH has not been previously disclosed.

What is needed is a perpendicular magnetic recording write head that has a trailing shield with a notch and a precisely defined throat height.

SUMMARY OF THE INVENTION

The invention is a perpendicular magnetic recording write head that may be used in magnetic recording disk drives. In a disk drive implementation the write head is formed on the trailing surface of a head carrier or slider that has an air-bearing surface (ABS) oriented generally perpendicular to its trailing surface and generally parallel to the surface of the disk during operation of the disk drive. The write head has a magnetic write pole (WP) on the trailing surface with a WP end at the ABS that has a width in the cross-track direction that is generally the same as the width of the data tracks on the disk. A trailing shield (TS) is formed on the WP and has a TS end generally coplanar with the WP end. The TS has a first portion with a width at the TS end substantially wider than the width of the WP end and a TS notch (TSN) portion with a width at the TS end generally equal to the width of the WP end. The TS first portion has a height in a direction perpendicular to the ABS, and the TSN portion has a throat height (TH) in a direction perpendicular to the ABS that is less than the height of the TS first portion. Nonmagnetic material is located between the TS and the WP and separates the TS from the WP. The nonmagnetic material includes a gap layer between the WP and the TSN portion and a pad layer between the WP and the TS first portion. The pad layer has a front edge generally parallel to and recessed from the ABS so that the TH of the TSN portion is generally equal to the distance from the ABS to the pad layer's front edge. The pad layer has a thickness that generally defines the length of the TSN portion in the along-the-track direction. Thus the pad layer defines both the length and TH of the TSN.

The write head may also include a magnetic shaping layer directly on the WP and located between the WP and the pad layer. The write head may also include side shields of magnetically permeable material spaced on opposite sides of the WP end in the cross-track direction. The side shields may be in contact with the TS to form a wraparound shield (WAS) around the WP.

For a fuller understanding of the nature and advantages of the present invention, reference should be made to the following detailed description taken together with the accompanying figures.

DETAILED DESCRIPTION OF THE INVENTION

Figure 1A:
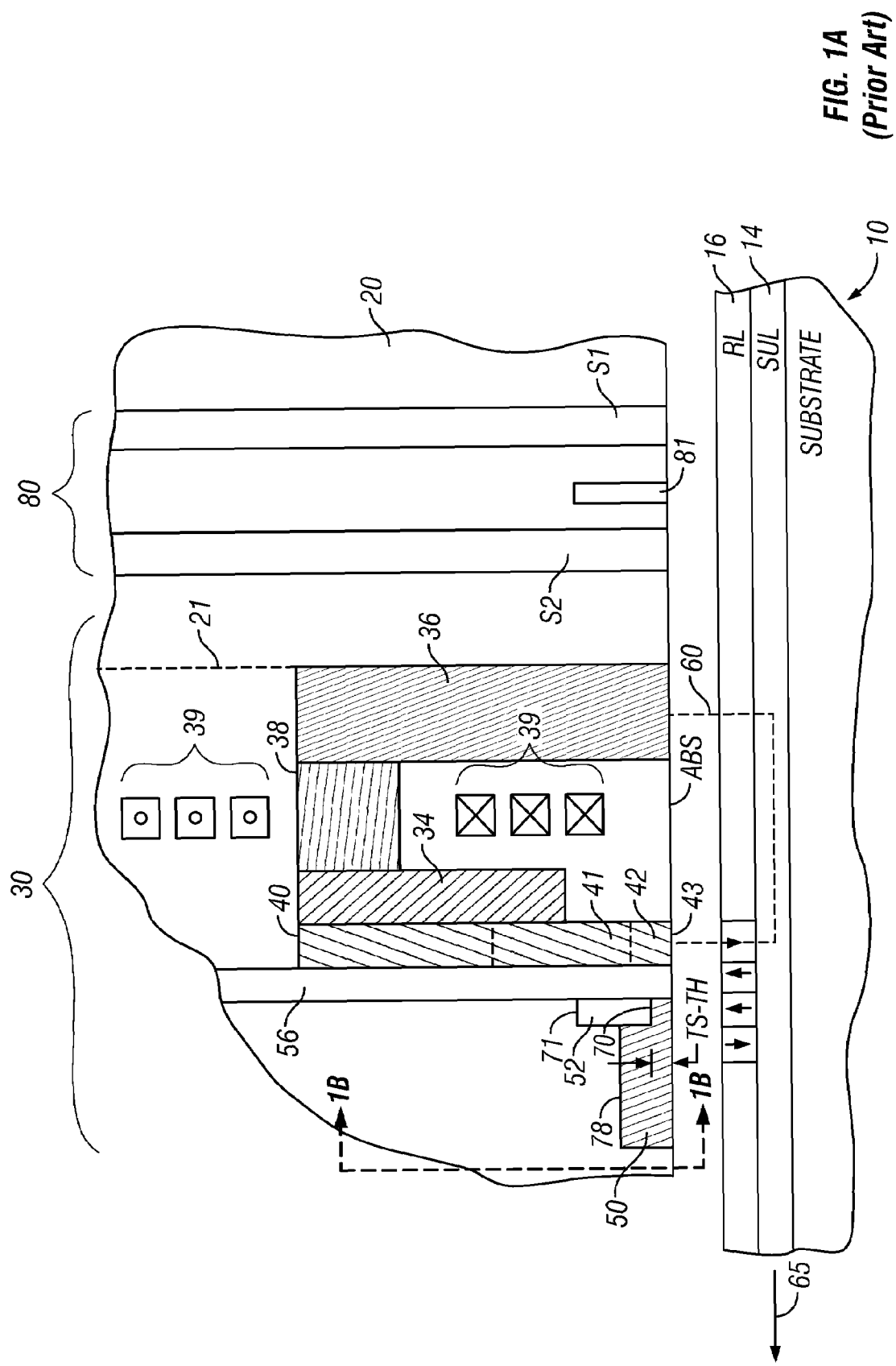
FIG. 1A is a side sectional view of a prior art perpendicular magnetic recording system showing a read head, a write head, and a recording medium.

FIG. 1A is a side sectional view of a prior art perpendicular magnetic recording write head, read head and a recording medium taken through a central plane that intersects a data track on the medium. As shown in FIG. 1A, a "dual-layer" medium 10 includes a perpendicular magnetic data recording layer (RL) 16 on a "soft" or relatively low-coercivity magnetically permeable underlayer (SUL) 14 formed on the disk substrate 12. This type of medium is shown with a single write pole type of recording or write head 30. The recording head 30 includes a yoke made up of the main pole 34, flux return pole 36, and yoke stud 38 connecting the main pole and return pole 36; and a thin film coil 39 shown in section wrapped around yoke stud 38. A flared write pole (WP) 40 is part of the main pole 34 and has a flared portion 41 and a pole tip 42 with an end 43 that faces the outer surface of medium 10. Write current through coil 39 induces a magnetic field (shown by dashed line 60) from the WP 40 that passes through the RL 16 (to magnetize the region of the RL 16 beneath the WP 40), through the flux return path provided by the SUL 14, and back to the return pole 36. The recording head is typically formed on a trailing surface 21 of an air-bearing slider 20 that has its air-bearing surface (ABS) supported above the surface of medium 10.

A magnetoresistive (MR) read head 80 comprised of a MR sensing element 81 located between MR shields S1 and S2 is also deposited on the trailing end of the slider 20 prior to the deposition of the layers making up the write head 30. As depicted in FIG. 1A, trailing surface 21 may be a nonmagnetic layer deposited on the MR shield S2. In FIG. 1A, the medium 10 moves past the recording head 30 in the direction indicated by arrow 65, so the portion of slider 20 that supports the MR head 80 and write head 30 is often called the slider "trailing" end, and the surface perpendicular to the slider ABS on which the write head 30 is located is often called the "trailing" surface.

The RL 16 is illustrated with perpendicularly recorded or magnetized regions, with adjacent regions having opposite magnetization directions, as represented by the arrows. The magnetic transitions between adjacent oppositely-directed magnetized regions are detectable by the MR sensing element 81 as the recorded bits.

FIG. 1A also illustrates a trailing shield (TS) 50 and a TS pad 52 that are separated from WP 40 by a nonmagnetic gap layer 56. The TS 50 has a throat height (TH) defined generally as the distance between the ABS and a front edge 70 of the TS pad 52. The TS 50 has a total thickness, in the direction perpendicular to the ABS, defined generally by the ABS and a back edge 78. The TS 50 is formed of magnetically permeable material and TS pad 52 is formed of nonmagnetic material. The TS 50 separated from the WP 40 by nonmagnetic gap 56 slightly alters the angle of the write field and makes writing more efficient. The portion of the TS that first receives the flux from WP 40 must be very thin, for example about 50 nm. However, it is difficult to reliably fabricate a TS to such small thicknesses. For that reason a nonmagnetic TS pad 52 is used. The TS pad 52 has a front edge 70 near the ABS and a back edge 71 recessed from the front edge 70. The TS pad 52 allows the TS to have a TH much thinner that the thickness of the remaining portion of the TS. A perpendicular magnetic recording write head with a TS and a TS pad, like that depicted in FIG. 1A, is described in pending application Ser. No. 11/090,456 filed Mar. 25, 2005, published as US2006/0215314 A1, and assigned to the same assignee as this application.

Figure 1B:
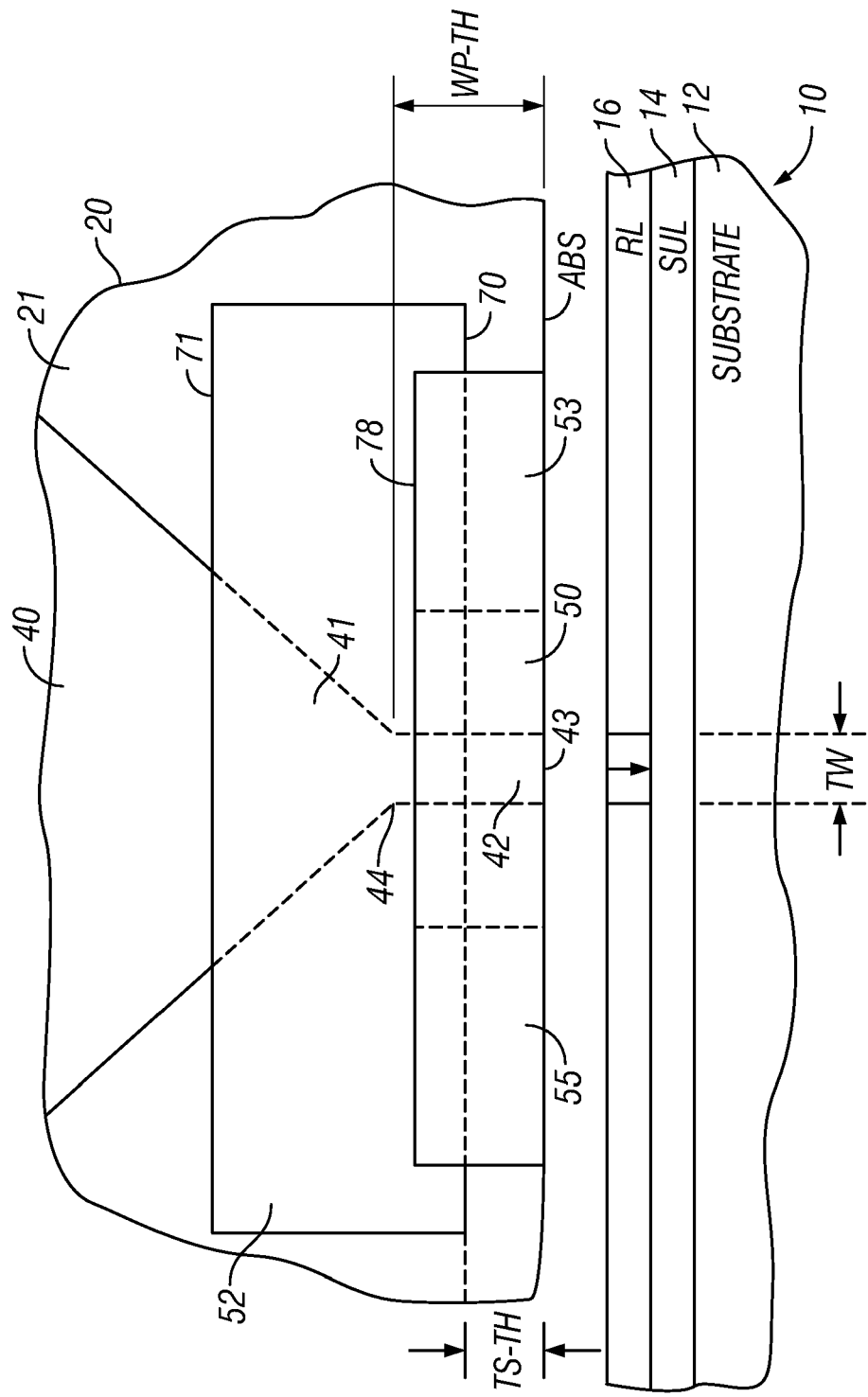
FIG. 1B is a view in the direction 1B-1B of FIG. 1A and shows the write pole (WP), the wraparound shield (WAS), and the trailing shield (TS) pad for defining the TS throat height (TS-TH).

FIG. 1B is a view in the direction 1B-1B of FIG. 1A to illustrate the WP 40, the TS 50 and the TS pad 52 on trailing surface 21 of slider 20. To simplify the illustration of FIG. 1B, neither the gap layer 56 nor the layers between WP 40 and the surface 21, shown in FIG. 1A, are shown in FIG. 1B. The region between the WP tip 42 and the flare portion 41 is called the flare point 44. The flare point 44 of the WP 40 is sometimes referred to as the "choke" point because it is the point where the flux density is highest and where the WP 40 saturates. The WP tip 42 has a throat height (TH) which is generally the distance from end 43 to flare point 44. As shown in FIG. 1B, the two side walls of WP tip 42 define its width in the cross-track direction, which substantially defines the track-width (TW) of the data recorded in the RL 16. The region of the WP 40 above the flare region 41 is substantially wider than WP tip 42 below the flare region 41 and the flare point 44 is recessed from the ABS and is the transition point where the WP 40 begins to widen with distance from the ABS. The flare angle between flare region 41 and WP 42 is between 90 and 180 degrees, typically between about 120 and 150 degrees.

FIG. 1B also illustrates the TS 50 and TS pad 52. The portions identified as 53, 55 on opposite ends of TS 50 are side shields which, together with TS 50 form a wraparound shield (WAS) that generally surrounds the WP tip 42. The TH for the TS 50 is the distance from the ABS to the front edge 70 of the TS pad 52.

Figure 1C:
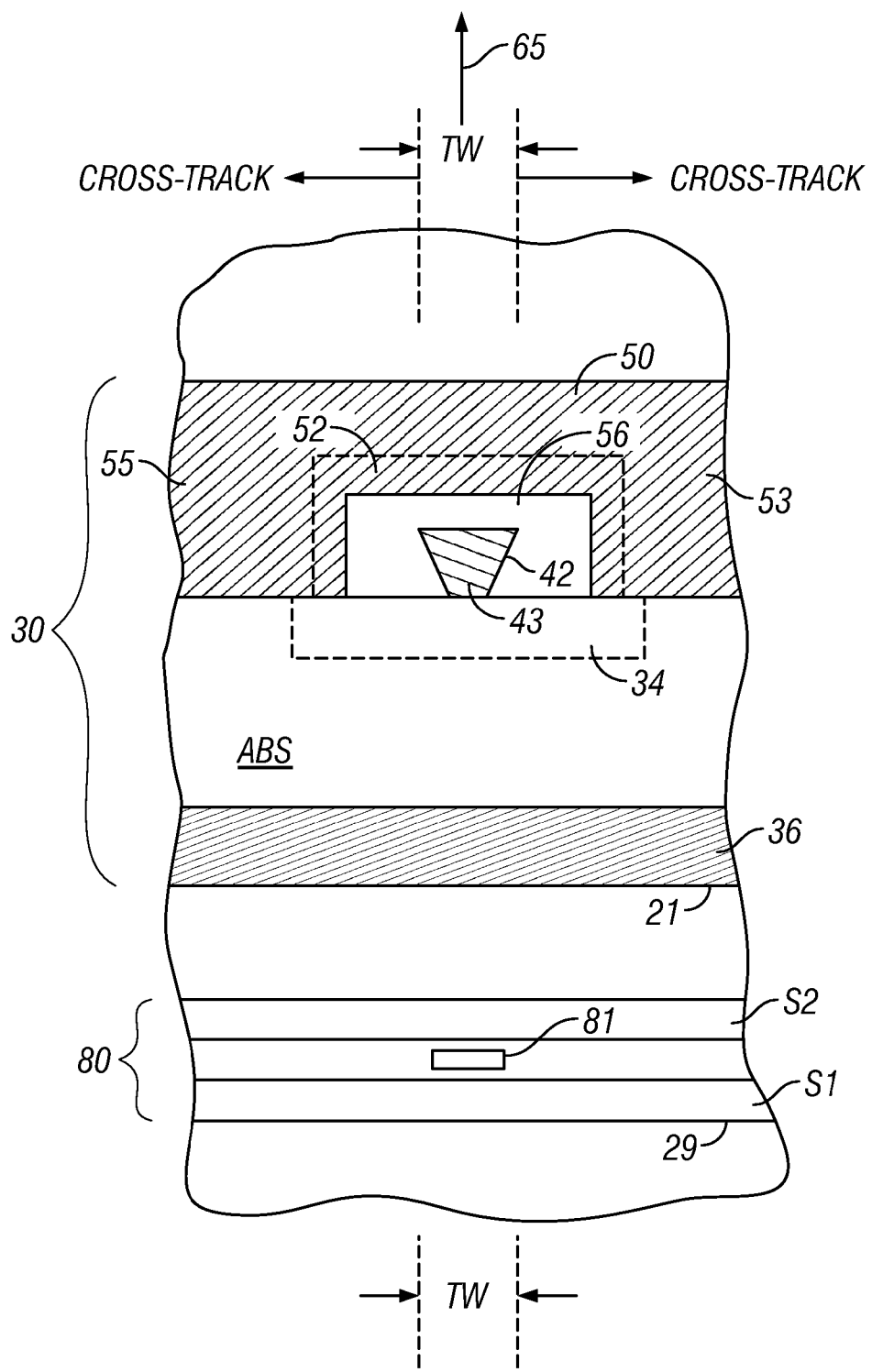
FIG. 1C is a view from the air-bearing surface (ABS) of the write head and read head in FIG. 1A and shows the WAS.

FIG. 1C illustrates the write head 30 as seen from the recording medium 10. The ABS is the recording-layer-facing surface of the slider that faces the medium 10 and is shown in FIG. 1C without the thin protective overcoat typically present in an actual slider. The recording-layer-facing surface shall mean the surface of the slider 20 that is covered with a thin protective overcoat, the actual outer surface of the slider if there is no overcoat, or the outer surface of the overcoat. The phrase "substantially at the recording-layer-facing surface" shall mean actually at the surface or slightly recessed from the surface. The recording medium 10 moves relative to the head 30 in the direction 65, which is called the along-the-track direction. The direction perpendicular to direction 65 and parallel to the plane of the ABS is called the cross-track direction. The width of the end 43 of WP tip 42 in the cross-track direction substantially defines the track-width (TW) of the data tracks in the RL 16. The main pole 34 is shown with dashed lines because it is recessed from the ABS (see FIG. 1A).

The WAS that includes side shields 53, 55 and TS 50 is described in detail as a shield for a conventional perpendicular recording head in U.S. Pat. No. 7,002,775 B2, assigned to the same assignee as this application. The shields 50, 53, 55 all have ends substantially at the recording-layer-facing surface. The shields 50, 53, 55 are typically connected to one another and substantially surround the WP tip 42 to from the WAS. The TS 50 and side shields 53, 55 are separated from WP tip 42 by nonmagnetic gap material, typically alumina, which forms the gap layer 56. The WAS separated from the WP tip 42 by gap layer 56 alters the angle of the write field and improves the write field gradient at the point of writing, and also shields the writing field at regions of the medium 10 away from the track being written. The WAS is shown as a "floating" shield, meaning that is not connected to the return pole 36. However, the WAS may be connected to either the return pole 36 or other portions of the yoke by flux-conducting material. In other variations of the write head 30, only a TS may be used without side shields. The TS may be either "floating" or connected to return pole 36.

FIG. 1C also illustrates the magnetoresistive (MR) read head 80 that includes the MR sensor 81 located between MR shields S1, S2. The films making up MR head 80 and write head 30 as shown in FIG. 1C are formed in succession on the trailing end of air-bearing slider 20, by a series of thin film deposition, etching and lithographic patterning processes. As shown in FIG. 1C, the films making up (MR) read head 80 are formed on substrate surface 29 and the films making up write head 30 are formed on substrate surface 21, which is typically a layer of nonmagnetic material, like alumina, that separates write head 30 from read head 80.

The yoke and shields of write head 30 are formed of soft ferromagnetic material, such as alloys of NiFe, CoFe and NiFeCo that are typically formed by electroplating. The WP 40 is formed of a high-moment material, such as a high-moment CoFe alloy, that is typically formed by sputter deposition, and may be a laminated structure.

Figure 2A:
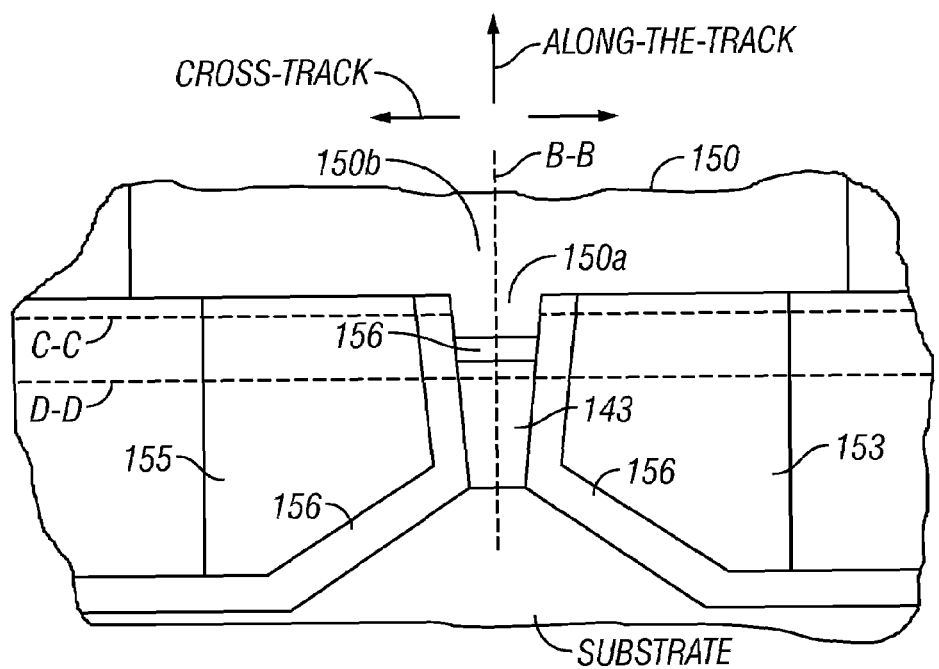
FIG. 2A is a view from the air-bearing surface (ABS) of the write head according to this invention.
Figure 2B:
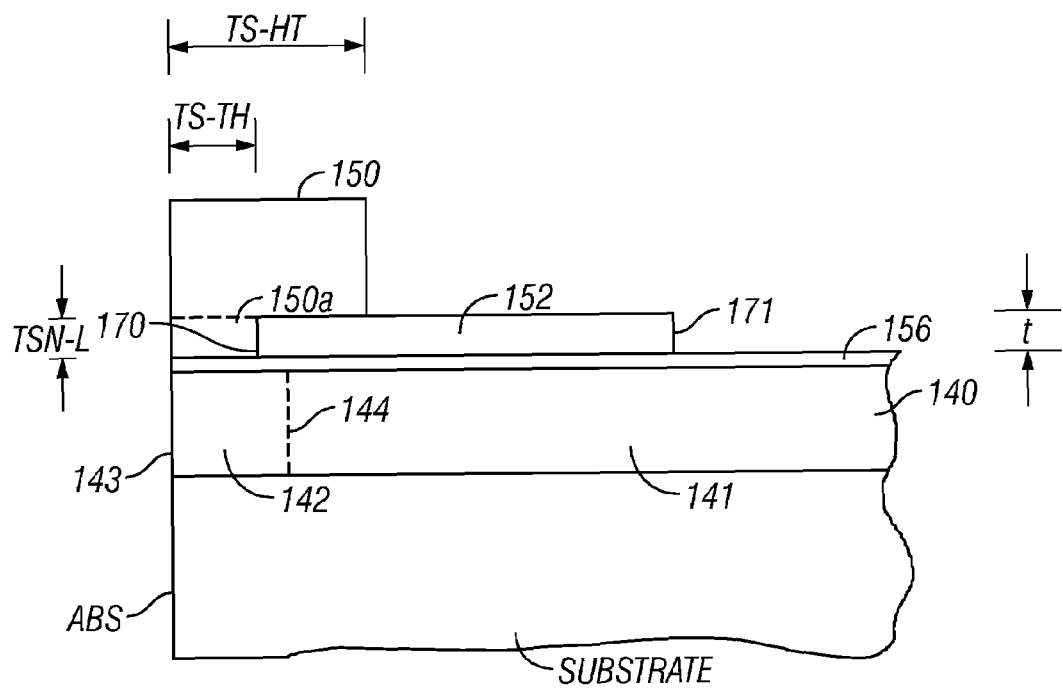
FIG. 2B is a sectional view through plane B-B of FIG. 2A.
Figure 2C:
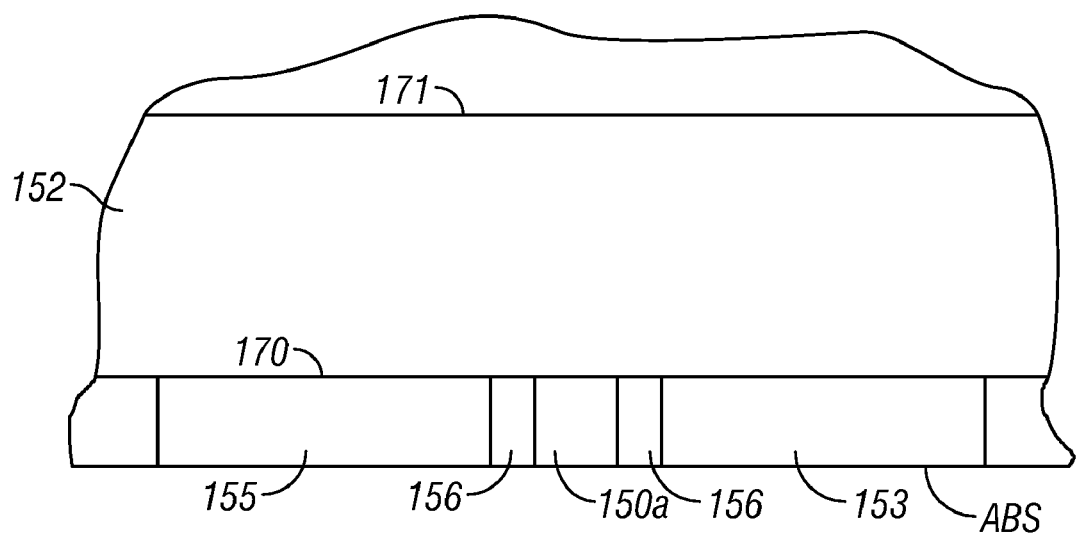
FIG. 2C is a sectional view through plane C-C of FIG. 2A.

FIG. 2A is a view from the ABS of the write head according to this invention and FIG. 2B is a sectional view through plane B-B of FIG. 2A, which is a central plane that intersects a data track on the medium. The write head includes a WP 140 formed as a layer of magnetic material on the substrate. A nonmagnetic gap layer 156 is formed on WP 140 and non-magnetic pad layer 152 is formed on gap layer 156. Pad layer 152 has a front edge 170 and back edge 171 and is formed to a thickness t. A TS 150 is formed over the WP 140 and pad layer 152. As shown in FIG. 2A, the TS 150 has a first portion 150b that is substantially wider in the cross-track direction that the cross-track width of WP end 143. The TS first portion 150b has a height (HT) measured from the ABS, as shown in FIG. 2C. The TS 150 also has a notch portion 150a that faces the WP and is called the TS notch (TSN). TSN 150a has a cross-track width generally the same as the cross-track width of WP end 143. The length of TSN 150a (TSN-L) in the along-the-track direction is defined generally by the thickness t of the pad layer 152. The TS 150 has a throat height (TS-TH) defined generally by the distance from the ABS to front edge 170 of pad layer 152, with TS-TH being less than TS-HT. FIG. 2A also shows side shields 153, 155 spaced on opposite sides of WP tip 142 with end 143. The side shields 153, 155 and TS 150 are separated from WP 142 by nonmagnetic gap 156. Side shields 153, 155 and TS 150 are connected to form a WAS that generally surrounds WP 140.

Figure 2D:
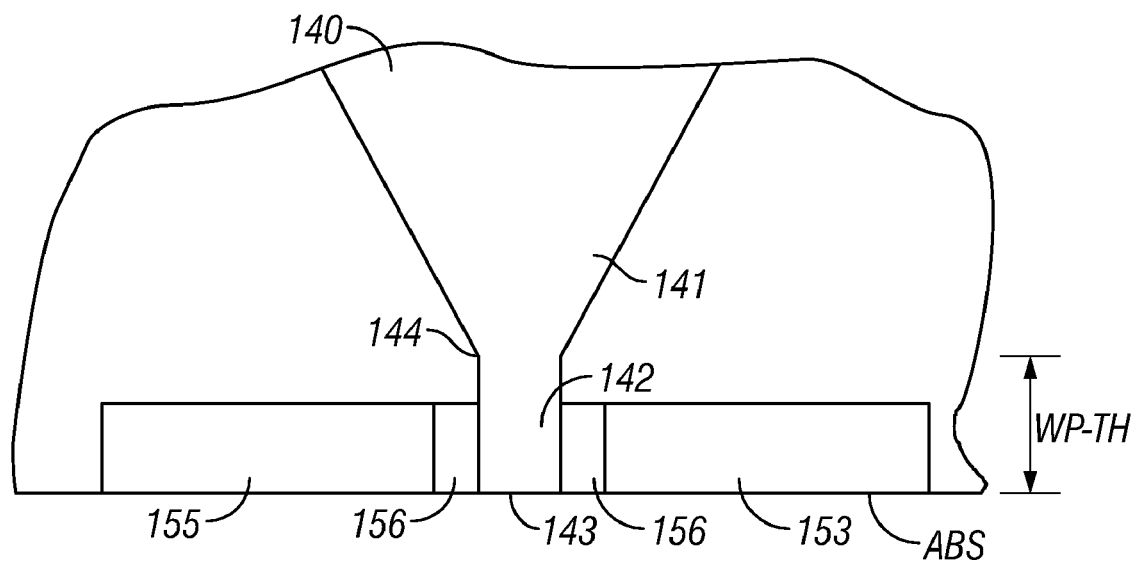
FIG. 2D is a sectional view through plane D-D of FIG. 2A.

FIG. 2C is a sectional view through plane C-C of FIG. 2A to better illustrate pad layer 152 with front edge 170 and back edge 171. FIG. 2D is a sectional view through plane D-D of FIG. 2A to better illustrate WP 140. WP 140 has WP tip 142 with an end 143 at the ABS and a flare portion 141 recessed from the ABS. The flare portion 141 begins at flare point 144, which is recessed from the ABS by a distance corresponding to the WP throat height (WP-TH).

Figure 3A:
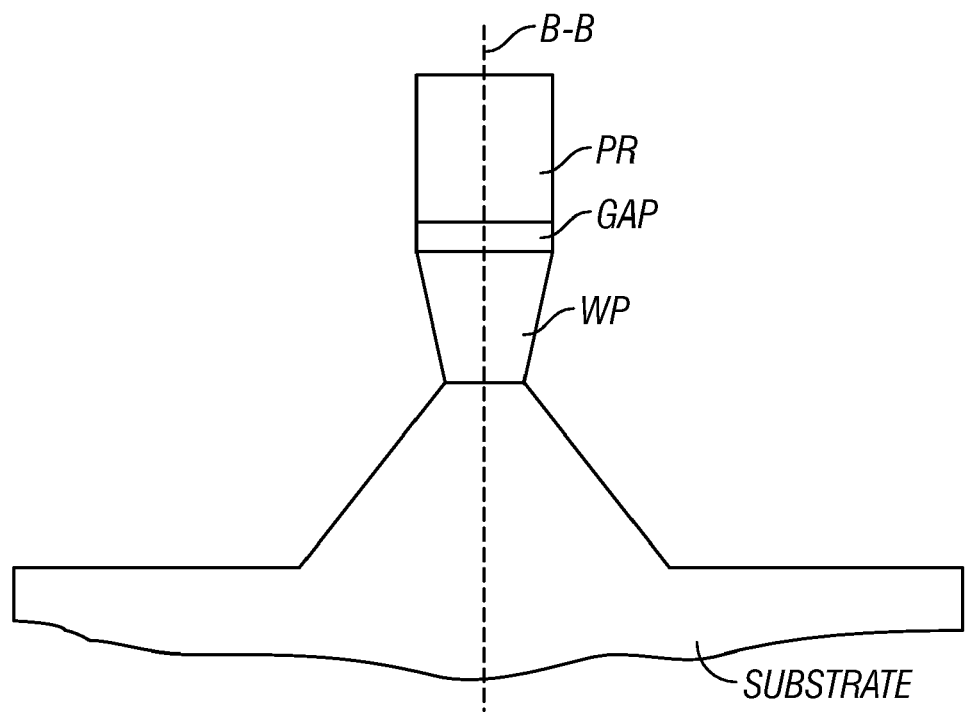
FIGS. 3A and 3B are views of the structure during a processing step in the fabrication of the write head shown in FIGS. 2A-2D.
Figure 3B:
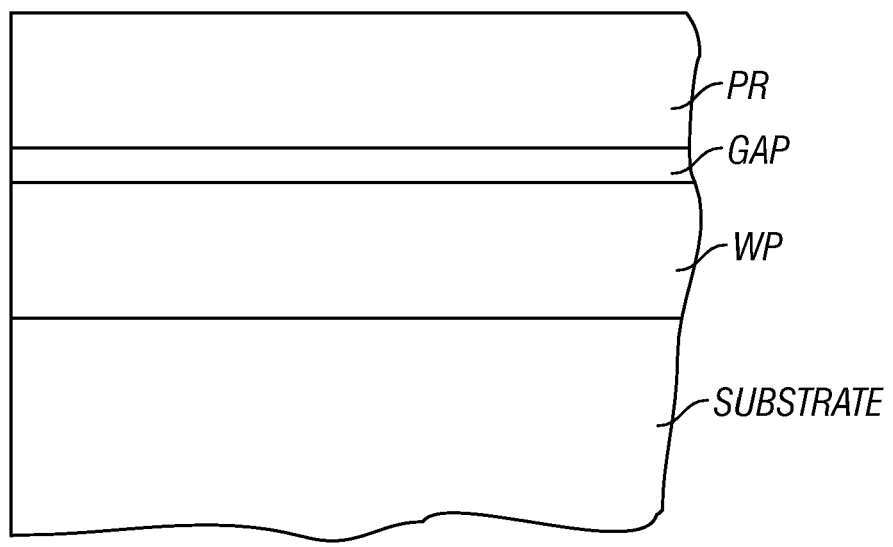

FIGS. 3A-9B inclusive illustrate the processing steps in fabricating the write head shown in FIGS. 2A-2D. Prior to achieving the structure in FIG. 3A, a WP layer of magnetic material is deposited on the substrate to a thickness corresponding to the desired thickness of the WP, typically in the range of about 100 to 250 nm. The WP layer is high-moment magnetic material, such as CoFe or NiFe, and is formed by sputtering or electroplating. A full film of alumina as the gap layer is deposited over the WP layer, typically by sputtering, and serves as a "thin alumina mask" (TAM) during subsequent ion milling to form the WP. Other materials that may serve as the gap layer include tantalum-oxide, silicon-oxide, silicon-nitride or diamond-like carbon. The gap layer is typically formed to a thickness in the range of about 20 nm to 60 nm and will serve as the gap layer 156 (FIG. 2A) between the WP end 143 and the TSN 150a. A layer of organic photoresist (PR) is deposited and patterned above the gap layer and underlying WP layer. The PR layer may be a photo-sensitive organic material provided it is not sensitive to radiation at the wavelengths used in other lithographic steps for forming the write head, or a photo-insensitive organic material like Durimide® 20-1.2 µm, a polyimide material available from Arch Chemicals, Inc. FIG. 3A shows the structure after reactive ion etching (RIE) and ion milling to remove portions of the layers not protected by the patterned PR layer. FIG. 3B is a sectional view through plane B-B of FIG. 3A.

Figure 4A:
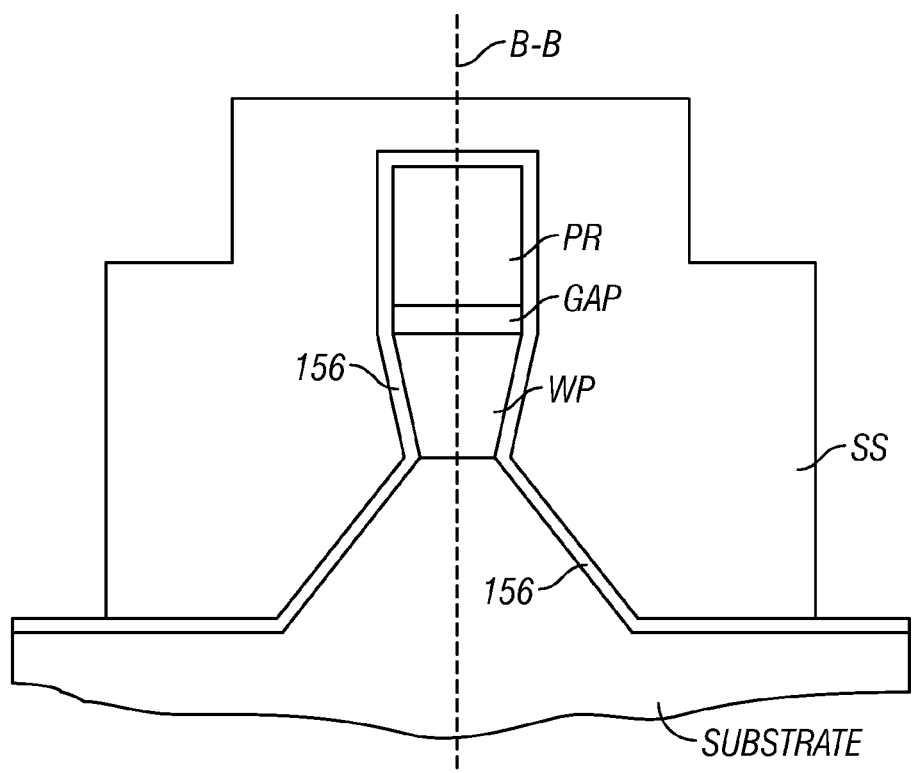
FIGS. 4A and 4B are views of the structure during a processing step in the fabrication of the write head shown in FIGS. 2A-2D.
Figure 4B:
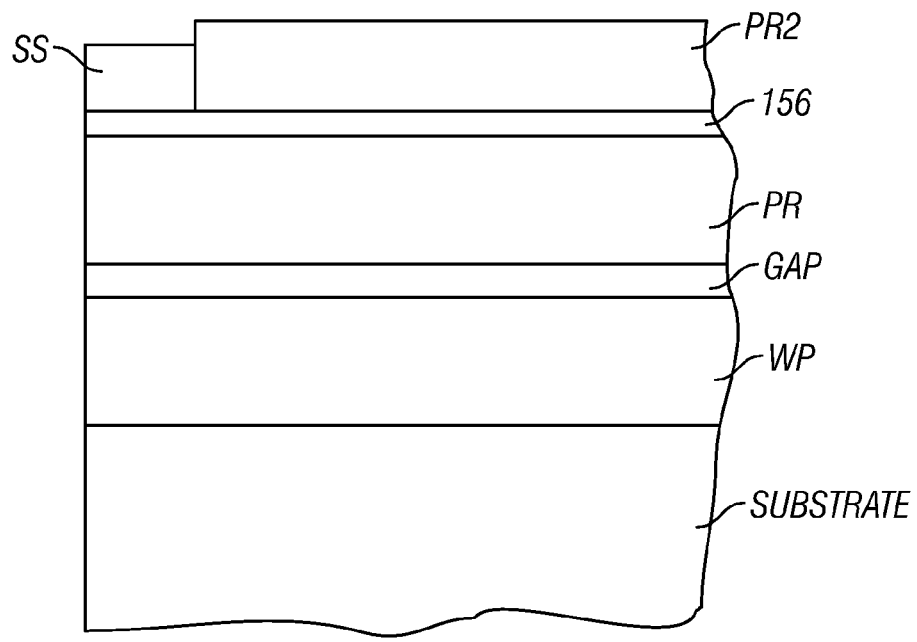

Next, in FIG. 4A a thin film of alumina is deposited by atomic layer deposition (ALD) over the structure to a thickness of about 40 to 200 nm to form gap layer 156 surrounding the structure. The ALD process is used because of its good conformal coverage over various topographies. Next an electrically conductive seed layer (not shown), such as Ru, Rh or a Au/Ta bilayer, is deposited over gap layer 156, to a thickness in the range of about 5 to 20 nm. A second photoresist layer (PR2), a portion of which is shown in FIG. 4B, a sectional view through plane B-B of FIG. 4A, is then patterned on the structure to define the area for subsequent electroplating of the magnetically permeable side shield (SS) material. The SS material is then electroplated onto the seed layer. The structure in FIG. 4A shows the WP spaced from the SS material by the nonmagnetic gap layer 156.

Figure 5A:
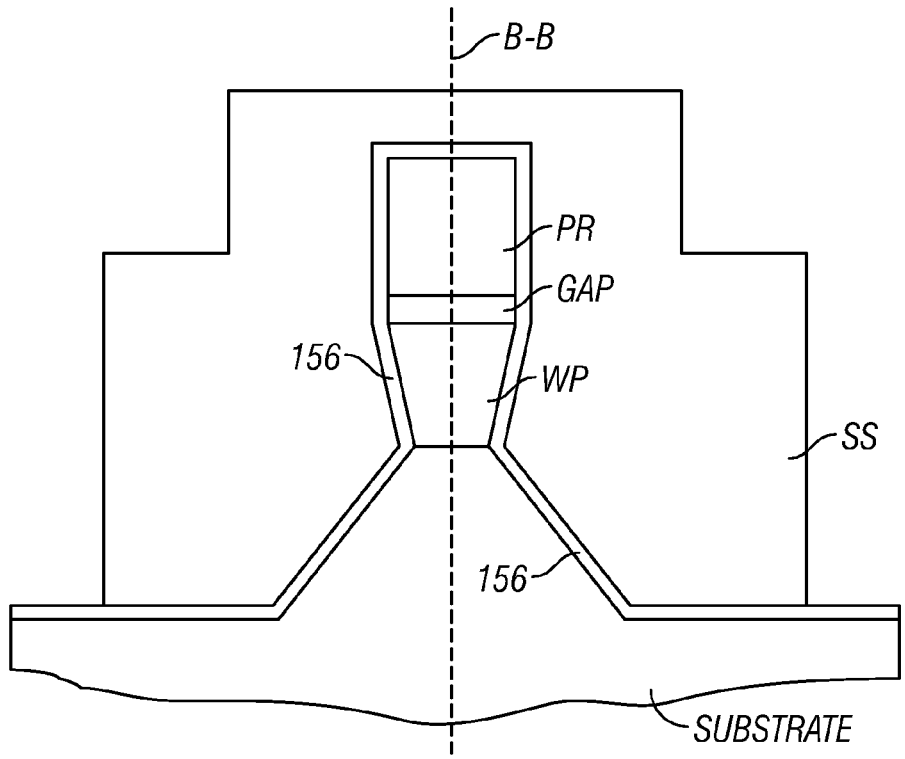
FIGS. 5A and 5B are views of the structure during a processing step in the fabrication of the write head shown in FIGS. 2A-2D.
Figure 5B:
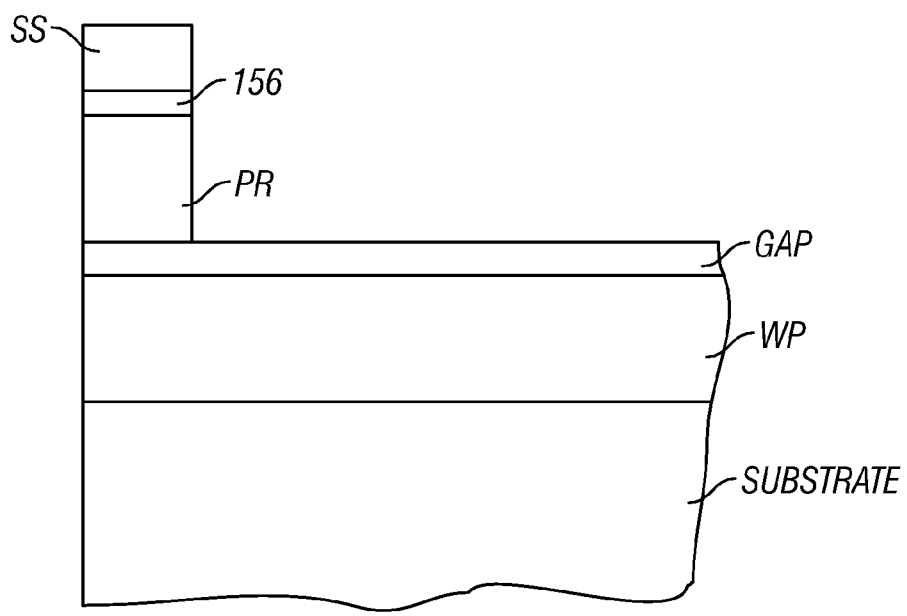

Next in FIGS. 5A and 5B, a sectional view through plane B-B of FIG. 5A, the PR2 layer is stripped and the structure ion milled to remove the gap layer 156 above the PR layer and the PR layer, leaving the gap layer in the back region recessed from the ABS.

Figure 6A:
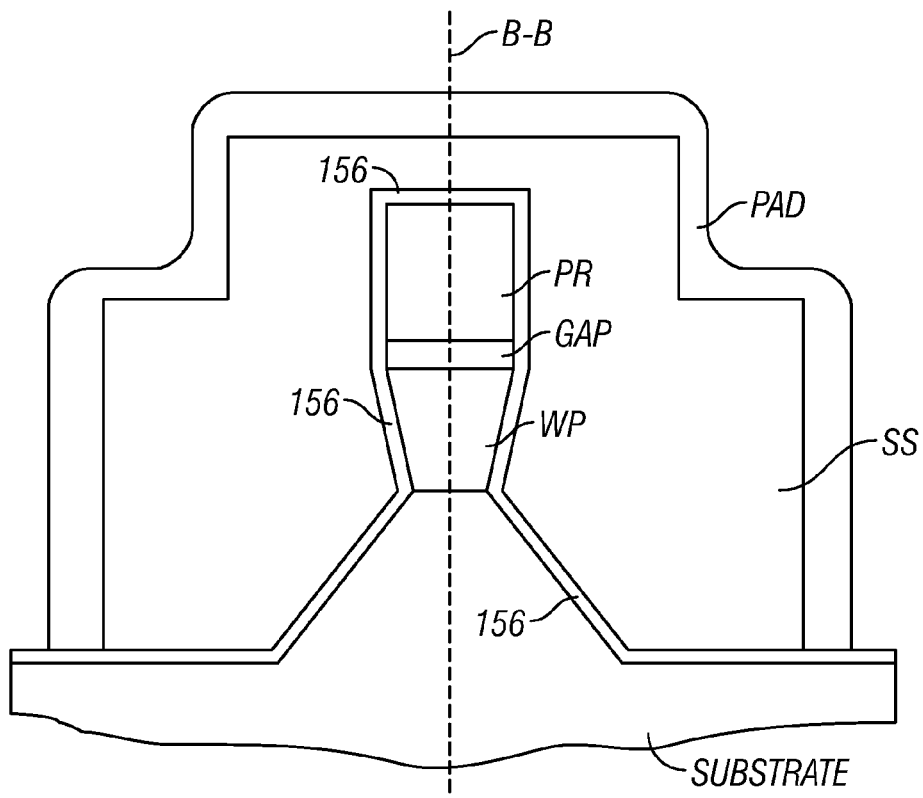
FIGS. 6A and 6B are views of the structure during a processing step in the fabrication of the write head shown in FIGS. 2A-2D.
Figure 6B:
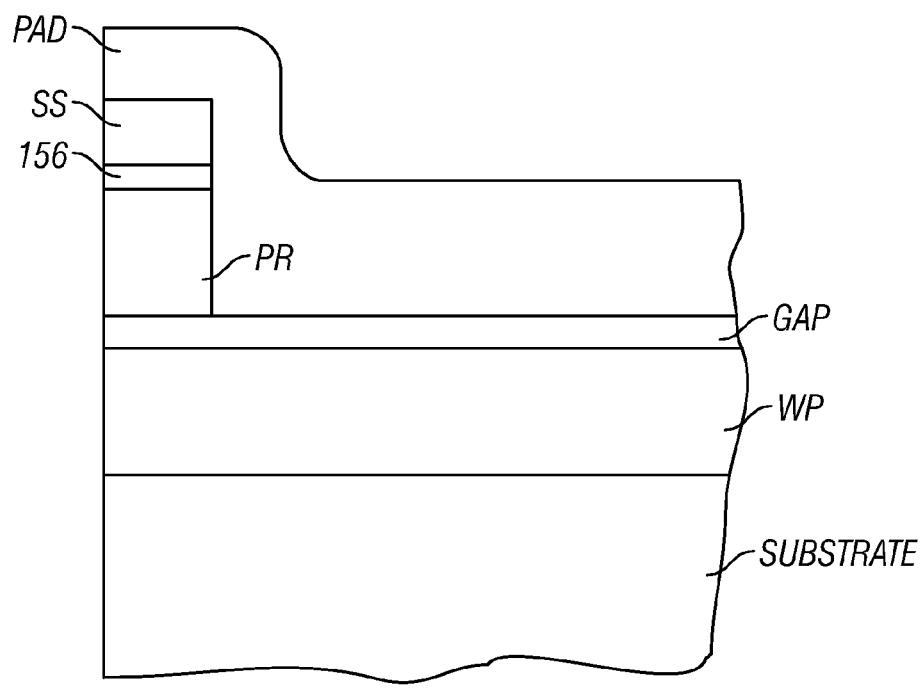
Figure 7A:
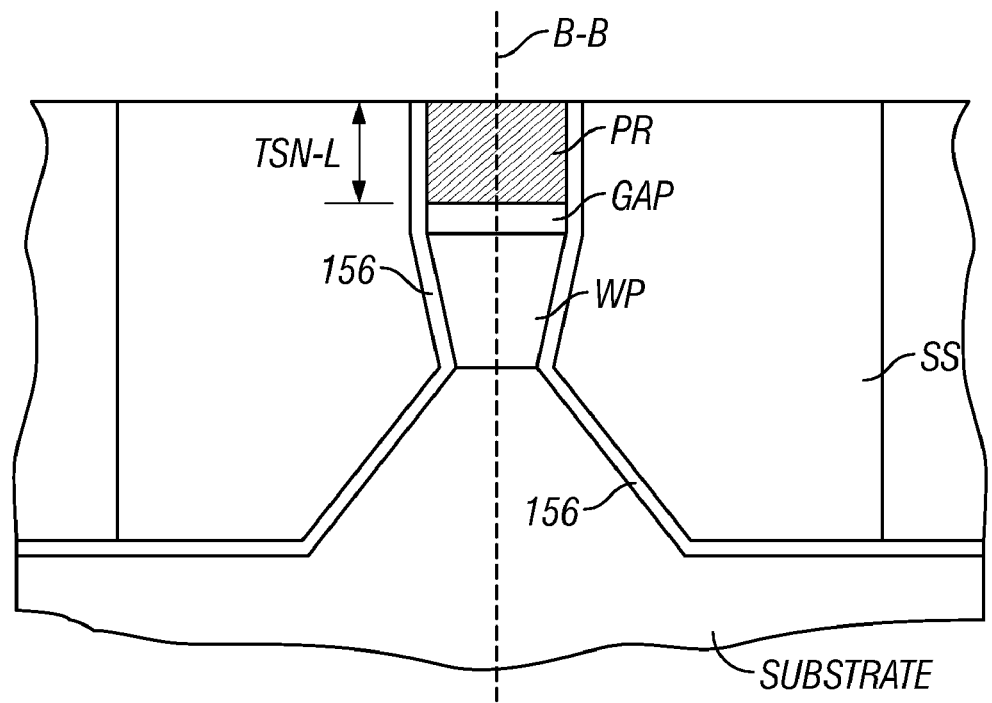
FIGS. 7A and 7B are views of the structure during a processing step in the fabrication of the write head shown in FIGS. 2A-2D.
Figure 7B:
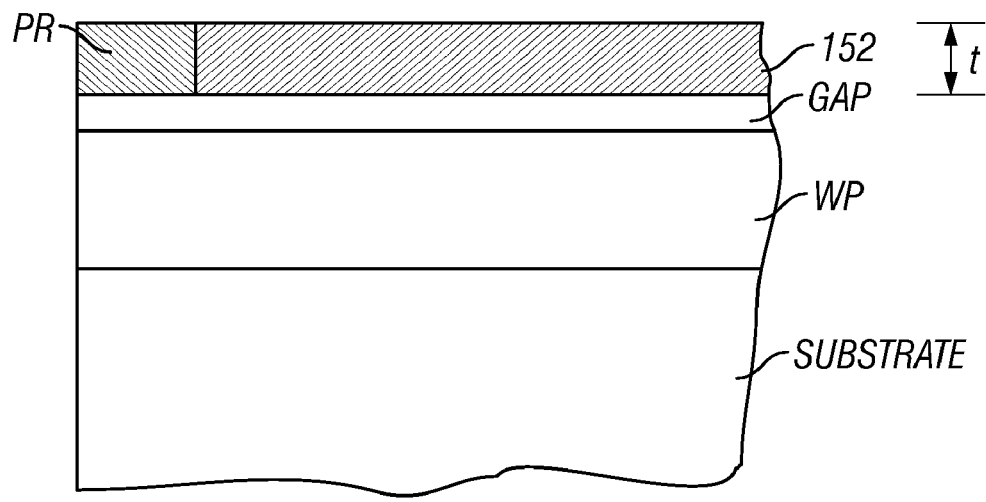

Next in FIGS. 6A and 6B, a sectional view through plane B-B of FIG. 6A, the nonmagnetic pad layer is deposited over the structure. The pad layer material is preferably tantalum oxide ($Ta_2O_5$) with a thickness of about 60-80 nm, but other nonmagnetic materials may be used, such as alumina ($Al_2O_3$), AlTiO, $SiO_2$ and Ta may be used. Then, in FIGS. 7A and 7B, a sectional view through plane B-B of FIG. 7A, the structure is ion milled and planarized by chemical-mechanical polishing (CMP). This defines the thickness t of pad layer 152 and thus generally the length of the TSN in the along-the-track direction (TSN-L).

Figure 8A:
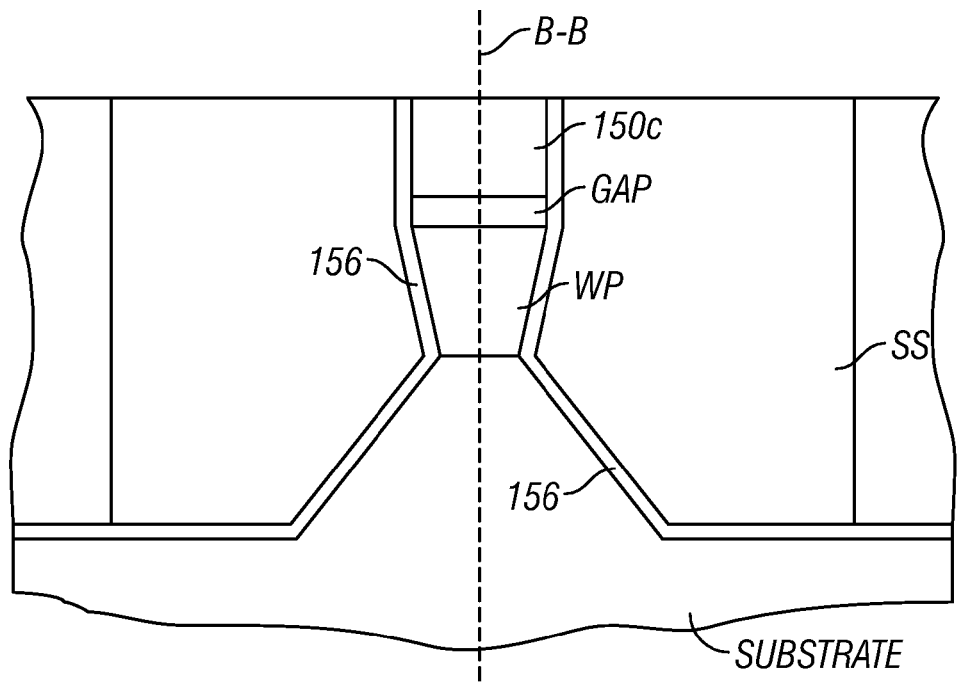
FIGS. 8A and 8B are views of the structure during a processing step in the fabrication of the write head shown in FIGS. 2A-2D.
Figure 8B:
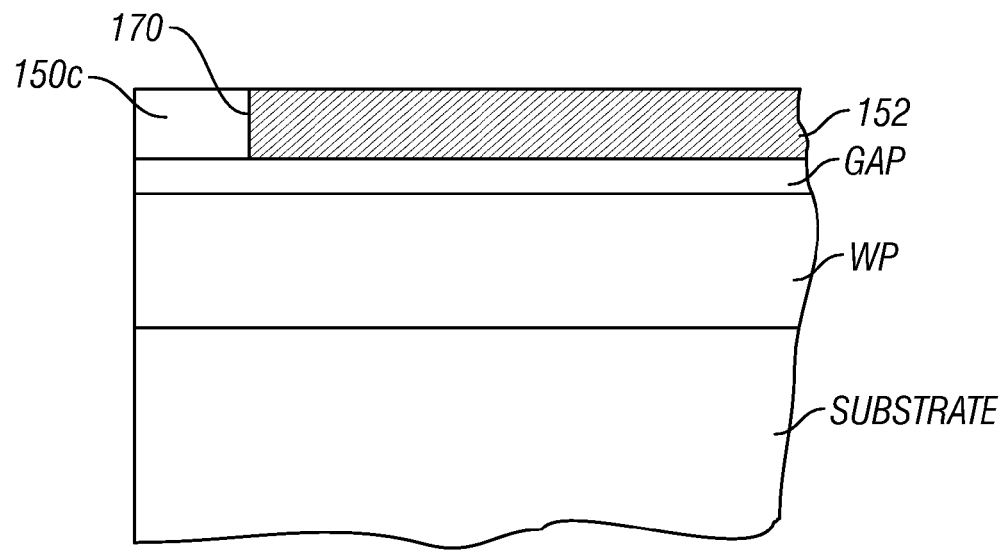
Figure 9A:
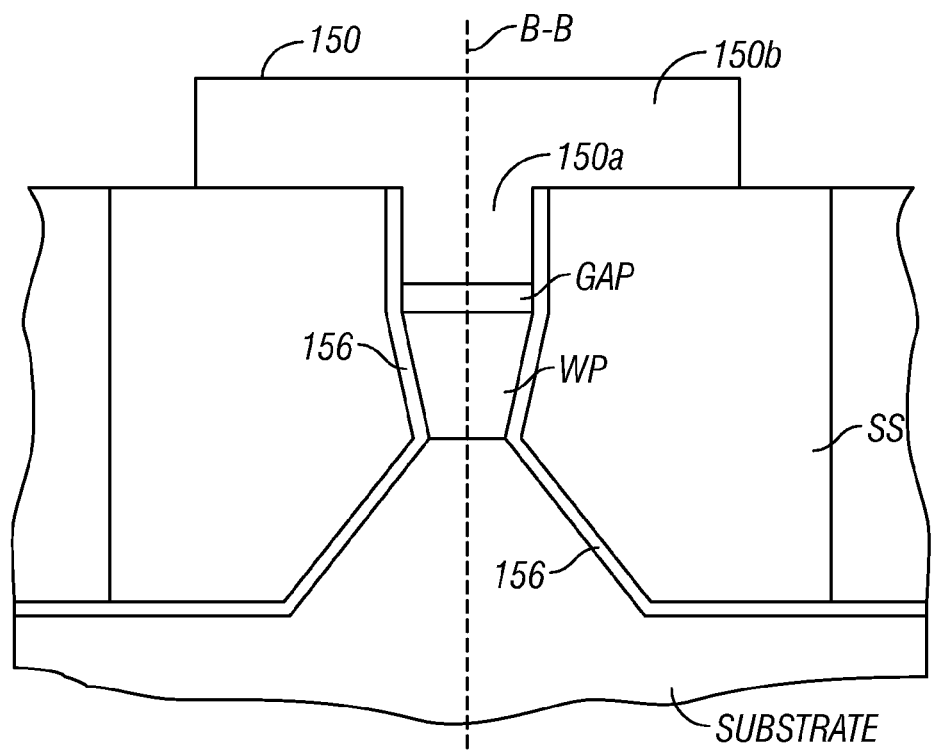
FIGS. 9A and 9B are views of the structure during a processing step in the fabrication of the write head shown in FIGS. 2A-2D.
Figure 9B:
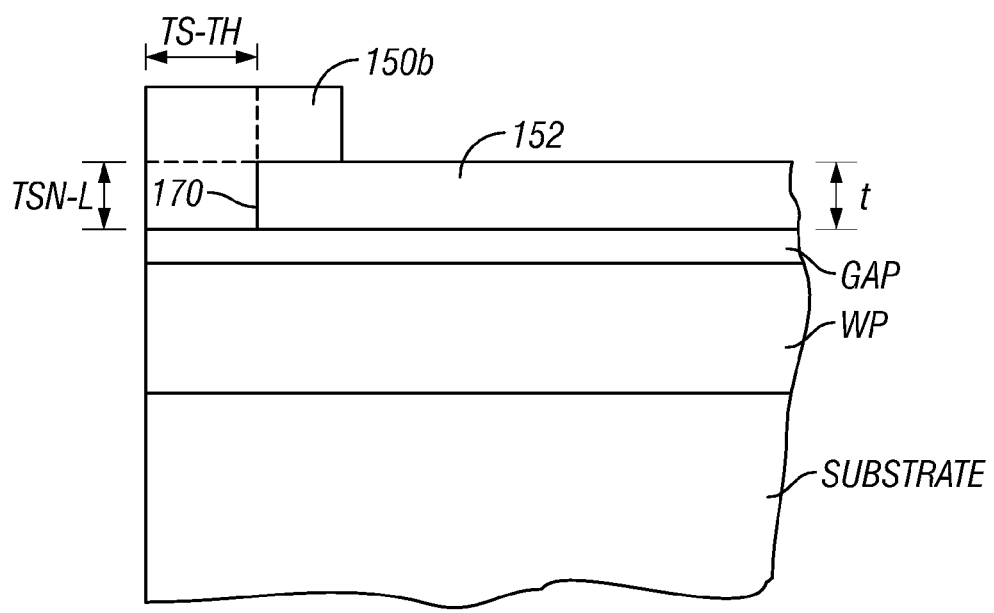

Next, in FIGS. 8A and 8B, a sectional view through plane B-B of FIG. 8A, the remaining PR layer is removed to leave an opening 150c above the gap and WP. Then, in FIGS. 9A and 9B, a sectional view through plane B-B of FIG. 9A, the structure is patterned with photoresist, the TS 150 is electroplated into the pattern and the photoresist is stripped. This results in the magnetically permeable material of the TS 150 being deposited into the opening 150c (FIGS. 8A-8B) to form the TSN 150a. The TS-TH is defined by front edge 170 of pad layer 152 and the TSN-L is defined by the thickness t of the pad layer 152.

Figure 10A:
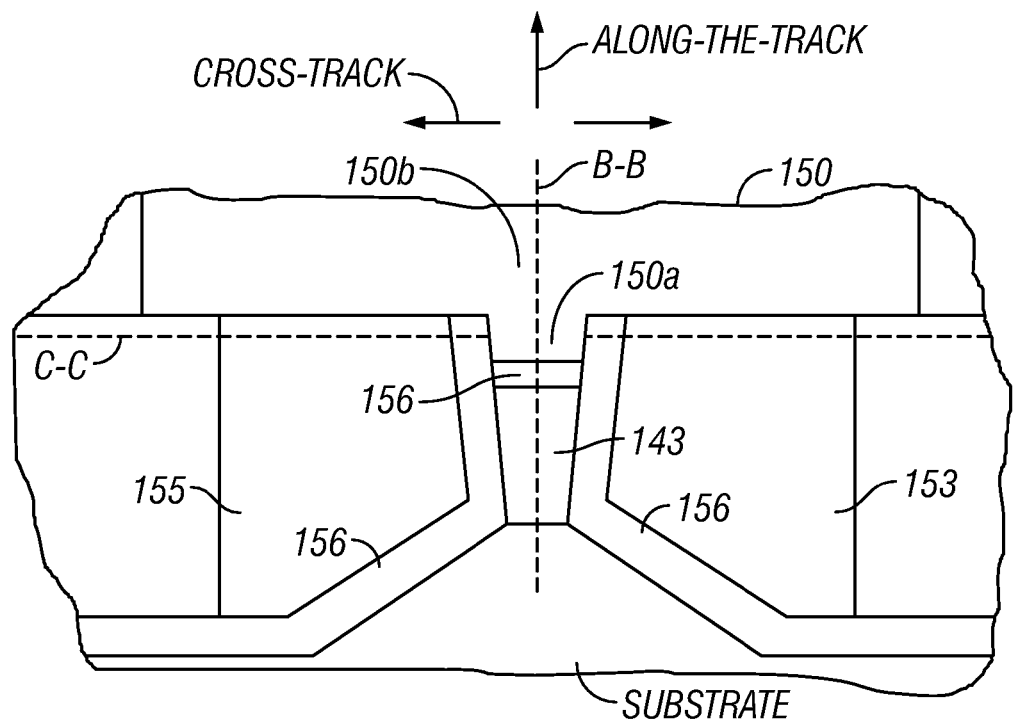
FIG. 10A is a view from the air-bearing surface (ABS) of another embodiment of the write head according to this invention.
Figure 10B:
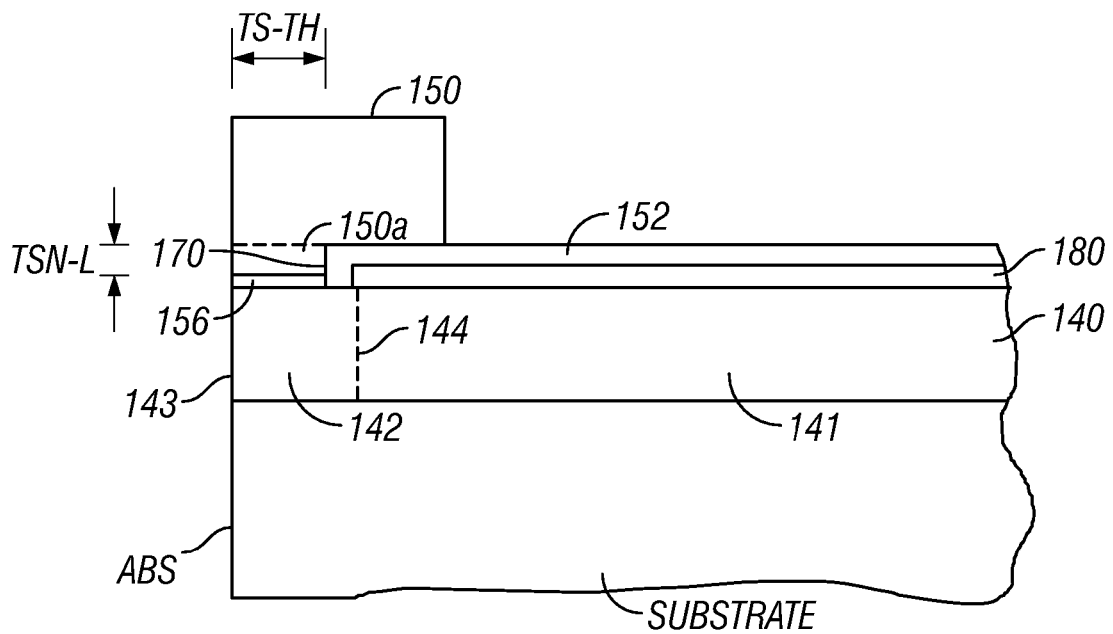
FIG. 10B is a sectional view through plane B-B of FIG. 10A.
Figure 10C:
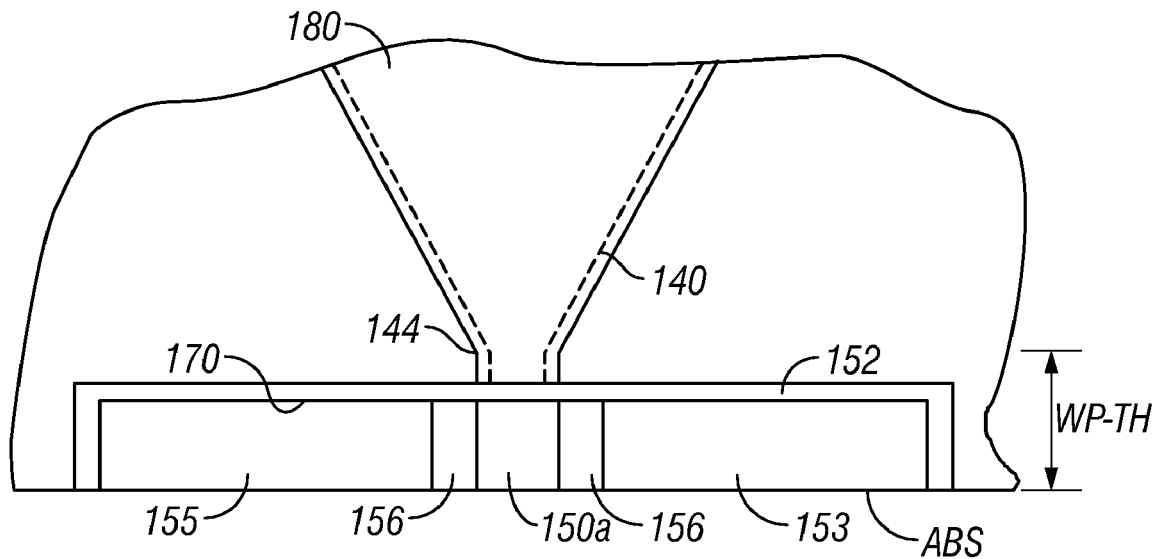
FIG. 10C is a sectional view through plane C-C of FIG. 10A.

FIGS. 10A-10C illustrate an embodiment wherein a magnetic shaping layer 180 is formed over the WP 140 and is located between the WP 140 and the pad layer 152. FIG. 10C is a sectional view of plane C-C in FIG. 10A and shows the underlying WP 140 in dashed line. The magnetic shaping layer 180 is formed of CoFe or NiFe to a thickness of about 20 to 50 nm, while the WP is typically formed of laminated CoFe plated CoFe/NiFe. The purpose of the magnetic shaping layer 180 is to enhance the write field of the WP by delivering more flux closer to the ABS. As shown in both FIG. 10B, which is a sectional view of plane B-B in FIG. 10A, and FIG. 10C, the front edge 170 of pad layer 152 is generally coincident with the front edge of the magnetic shaping layer 180.

Figure 11A:
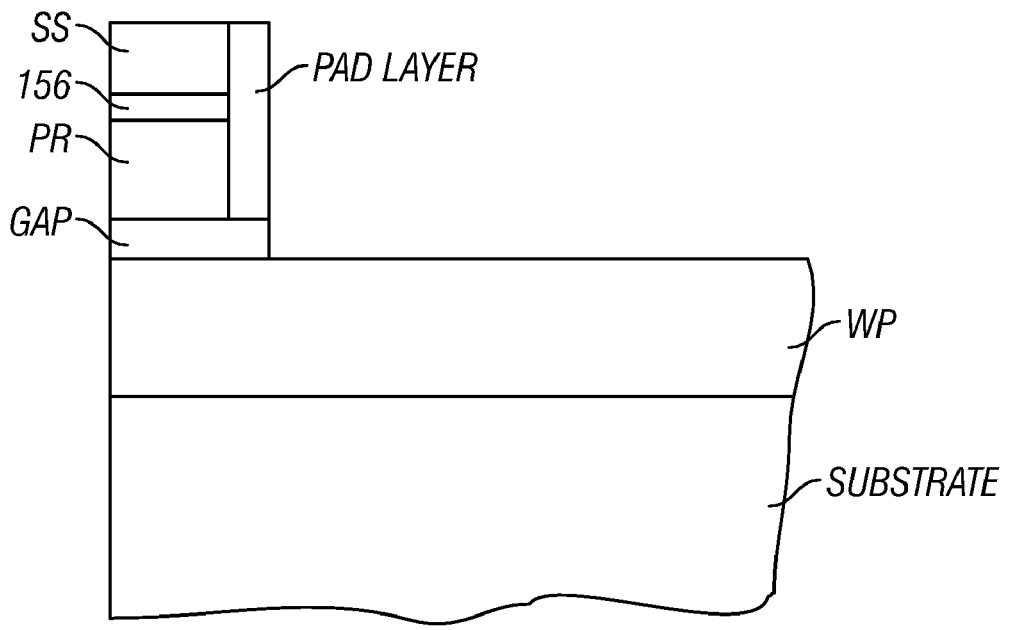
FIGS. 11A through 11F are sectional views of the structure during processing steps in the fabrication of the write head shown in FIGS. 10A-10C.
Figure 11B:
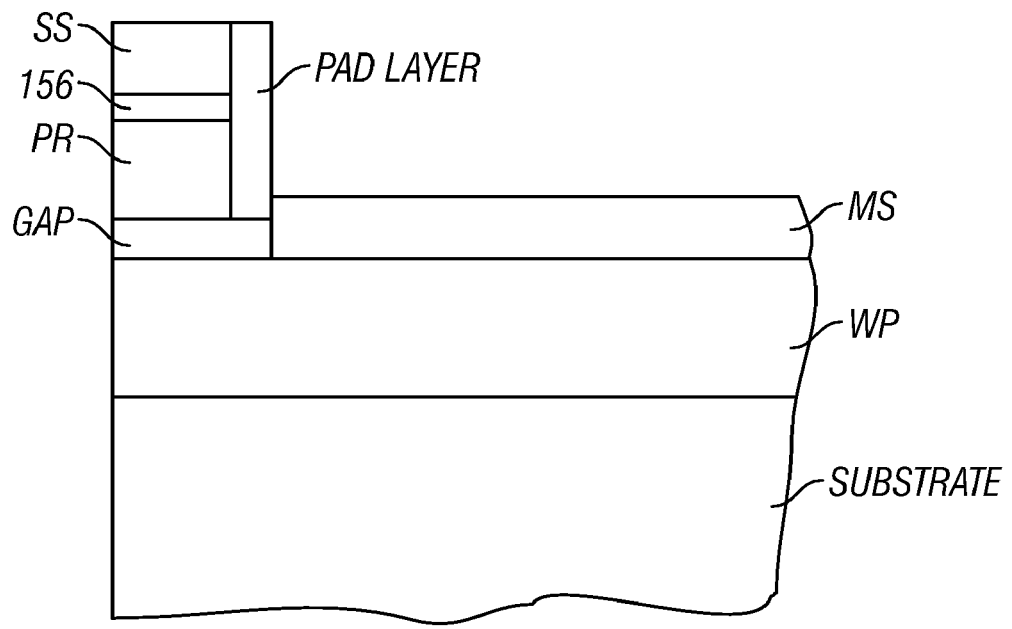
Figure 11C:
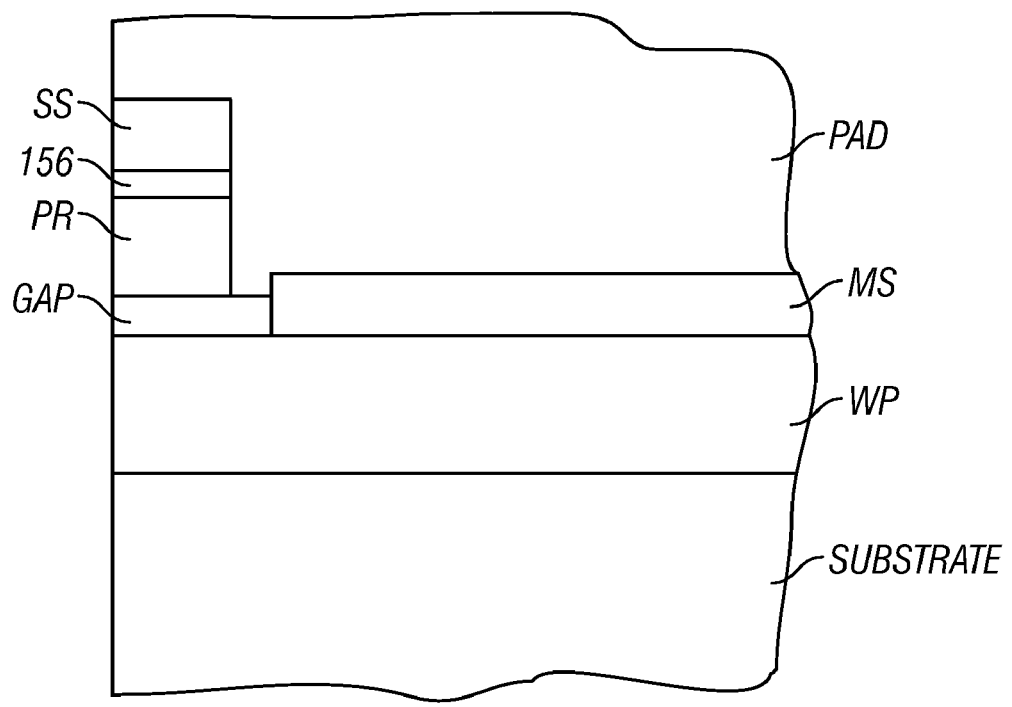
Figure 11D:
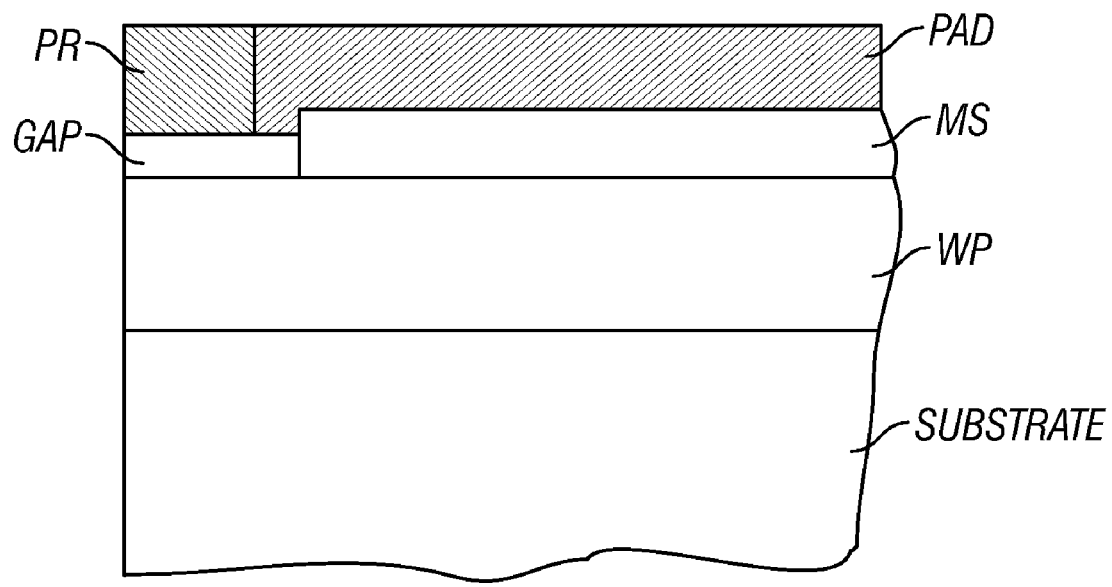
Figure 11E:
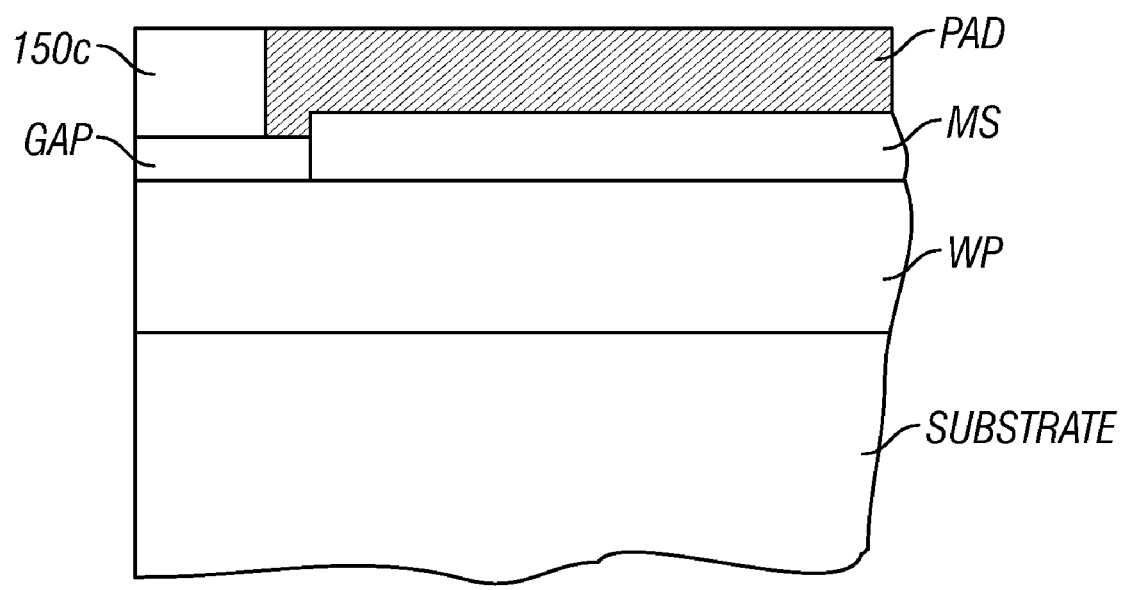
Figure 11F:
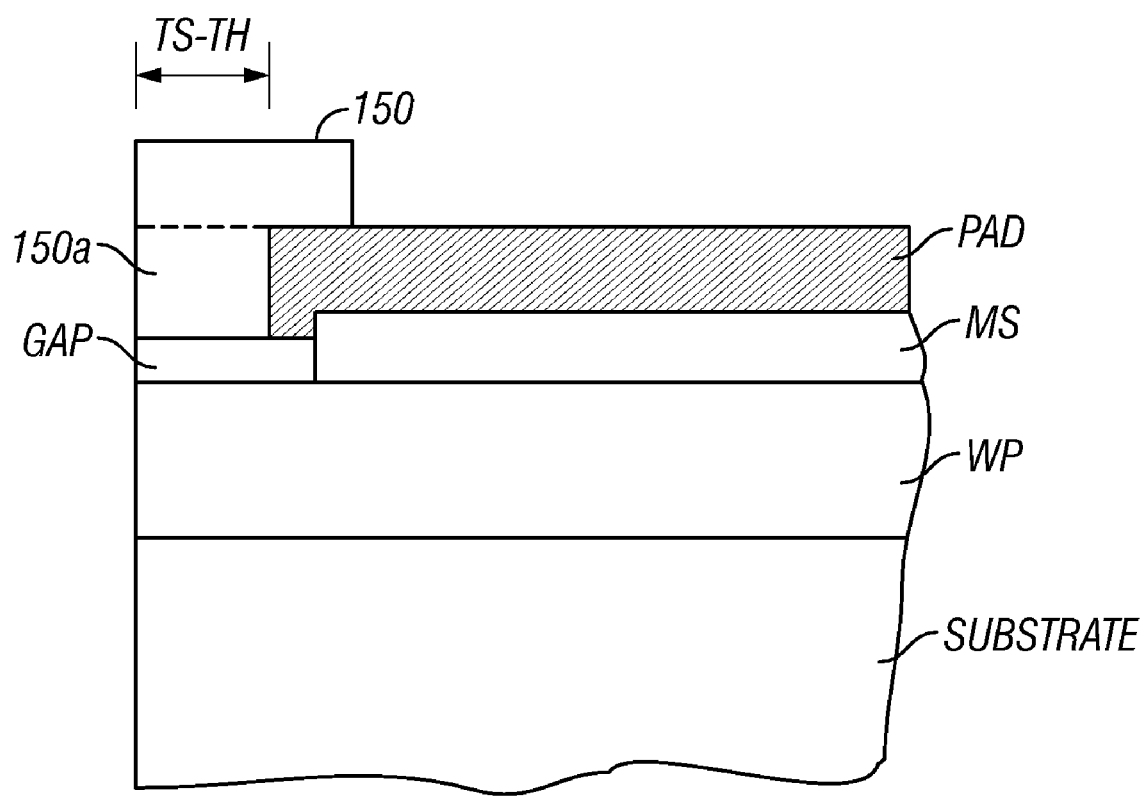

FIGS. 11A-11F are sectional views, like the sectional view of FIG. 6B, that illustrate the process steps in fabricating the write head shown in FIGS. 10A-10C. The process is identical to the process for fabricating the write head illustrated in FIGS. 2A-2C up through the step illustrated in FIG. 6B. Then, as shown in FIG. 11A, the structure is ion milled to remove the pad layer material and gap layer in the back region recessed from the ABS, exposing the WP layer in the recessed region and leaving a portion of the pad layer at the back edge of the SS material and PR material that will be later removed for deposition of the TS. Next, as shown in FIG. 11B, photoresist is patterned over the structure and the magnetic shaping (MS) layer is electroplated over the WP layer. FIG. 10C shows the MS layer 180 with underlying WP layer 140 following this step. The photoresist is then stripped and the structure refilled with pad layer material, as shown in FIG. 11C. Then, in FIG. 11D the structure is ion milled and planarized by CMP until the combined thickness of the pad layer and the MS layer is achieved. Then, in FIG. 11E, the remaining PR layer is removed to leave an opening 150c above the gap and WP. The structure is patterned with photoresist, the TS 150 is electroplated into the pattern and the photoresist is stripped. This results in the magnetically permeable material of the TS being deposited into the opening 150c to form the TSN 150a. The TS-TH is defined by front edge 170 of pad layer 152, as shown in FIG. 11F.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A perpendicular magnetic recording write head for magnetizing regions in data tracks of a magnetic recording layer comprising:
    a substrate;
    a magnetic write pole (WP) comprising a layer of magnetic material formed on the substrate, the WP having a cross-track width at an end facing the recording layer and a wider cross-track width at a region recessed from the end, the WP having a throat height from its end to a transition point where its width transitions to its wider width;
    a nonmagnetic pad layer on the WP layer and having a front edge recessed from the WP end;
    a trailing shield (TS) comprising a layer of magnetically permeable material on the WP layer and pad layer, the TS having an end generally coplanar with the WP end, the TS end having a cross-track width substantially wider than the WP's cross-track width and a notch facing the WP and having a width generally equal to the WP's cross-track width, the TS having a throat height (TH) from its end to the pad layer front edge; and
    a nonmagnetic gap layer between the WP layer and the TS in the region between the TS end and the pad layer front edge.

2. The write head of claim 1 wherein the thickness of the pad layer is substantially the same as the length of the TS notch in the along-the-track direction.

3. The write head of claim 1 further comprising a magnetic shaping layer between the WP layer and the pad layer.

4. The write head of claim 3 wherein the magnetic shaping layer has a front edge generally aligned with the front edge of the pad layer.

5. The write head of claim 3 wherein the magnetic shaping layer is formed of a material different from the material of the WP layer.

6. The write head of claim 1 further comprising side shields of magnetically permeable material on the substrate spaced on opposite sides of the WP in the cross-track direction, the side shields having ends substantially coplanar with the WP end.

7. The write head of claim 6 wherein the sides shields are connected to the TS to form a wraparound shield (WAS).

8. The write head of claim 6 wherein the TS is formed of a material different from the material of the side shields.

9. A magnetic recording disk drive perpendicular write head having an air-bearing surface (ABS) oriented generally parallel to the disk surface during operation of the disk drive and a trailing surface generally perpendicular to the ABS, the write head comprising:
    a magnetic write pole (WP) comprising a layer of magnetic material on the trailing surface and having a WP end at the ABS, the WP end having a width parallel to the trailing surface;
    a trailing shield (TS) comprising a layer of magnetically permeable material on the WP layer and having a TS end generally coplanar with the WP end, the TS having
        a first portion with a width at the TS end substantially wider than the width of the WP end and a height in a direction perpendicular to the ABS, and
        a TS notch portion with a width at the TS end generally equal to the width of the WP end, a length in a direction perpendicular to the trailing surface, and a throat height (TH) in a direction perpendicular to the ABS less than the height of the TS first portion; and
    nonmagnetic material between the WP and the TS.

10. The write head of claim 9 wherein the nonmagnetic material comprises a nonmagnetic gap layer between the WP and the TS notch portion.

11. The write head of claim 9 wherein the nonmagnetic material comprises a nonmagnetic pad layer between the WP and the TS first portion.

12. The write head of claim 11 wherein the pad layer has a front edge generally parallel to and recessed from the ABS and wherein the TS TH is generally equal to the distance from the ABS to said pad layer front edge.

13. The write head of claim 11 wherein the length of the TS notch portion is generally equal to the thickness of the pad layer.

14. The write head of claim 9 further comprising a magnetic shaping layer directly on the WP and located between the WP and the nonmagnetic material.

15. The write head of claim 9 further comprising side shields of magnetically permeable material on the trailing surface and spaced on opposite sides of the WP, the side shields having ends substantially coplanar with the WP end, and nonmagnetic material between the WP and the side shields.

16. The write head of claim 15 wherein the side shields are connected to the TS to form a wraparound shield (WAS).

17. The write head of claim 15 wherein the TS is formed of a material different from the material of the side shields.

* * * * *